US005546742A

United States Patent [19]

Shekhawat et al.

[11] Patent Number: 5,546,742

[45] Date of Patent: Aug. 20, 1996

[54] AIRCRAFT ENGINE ELECTRIC START SYSTEM WITHOUT A SEPARATE EXCITER FIELD INVERTER

[75] Inventors: Sampat Shekhawat; John J. Tumpey; James C. Widdis, all of Monmouth, N.J.

[73] Assignee: AlliedSignal Inc., Morris Township, Morris County, N.J.

[21] Appl. No.: 282,698

[22] Filed: Jul. 29, 1994

[51] Int. Cl.⁶ ........................................ F02C 7/268

[52] U.S. Cl. ........................ 60/39.142; 290/31; 290/46

[58] Field of Search ........................ 60/39.141, 39.142; 244/53 A; 290/31, 32, 46

[56] References Cited

U.S. PATENT DOCUMENTS

| | | | |
|---|---|---|---|
| 4,494,372 | 1/1985 | Cronin | 60/39.142 |
| 4,937,508 | 6/1990 | Rozman | 318/254 |
| 5,013,929 | 5/1991 | Dhyanchand | 290/31 |
| 5,068,590 | 11/1991 | Glennon et al. | 290/46 |
| 5,097,195 | 3/1992 | Raad et al. | 290/46 |

*Primary Examiner*—Louis J. Casaregola
*Attorney, Agent, or Firm*—Howard G. Massung; Verne E. Kreger, Jr.

[57] ABSTRACT

An aircraft engine start system eliminates the need of a separate exciter field inverter by rearranging the exciter field windings and by utilizing external AC power. The aircraft engine is started by external AC power and once the engine has started, the engine can supply power back to a variable frequency AC bus as well as back to a constant frequency AC bus through the start/generator converter mode.

7 Claims, 2 Drawing Sheets

AIRCRAFT ENGINE ELECTRIC START SYSTEM WITHOUT A SEPARATE EXCITER FIELD INVERTER

BACKGROUND OF THE INVENTION

1. Field of the Invention

The present invention relates to an engine start system for aircraft and more particularly to a bi-directional converter-start/generator.

2. Description of the Prior Art

Most of the aircraft in service today use hydromechanically driven or controlled 400 Hz power systems. The Auxiliary Power Unit (APU) is also used in case of emergency. At present, the APU is started by a DC motor and the aircraft main engine is started by an air turbine. Once the engine picks up ignition speed, the air turbine must shut off or else a dangerous condition exists. One alternative attractive approach to main engine starting is to utilize an AC electric start. Such an AC electric start must provide constant voltage-constant frequency as well as constant voltage-variable frequency.

Even an AC electric start system requires several components working together in conjunction to provide engine start capabilities to the aircraft main engine. Each of these components adds weight, expense and complexity to the aircraft. One such critical component is a small power inverter for the exciter field winding of the engine. It is an object of the present invention to reduce weight, expense and complexity by eliminating this power inverter.

SUMMARY OF THE INVENTION

The present invention provides a system that allows for aircraft engine starting electrically without an excited field inverter. The system provides a constant voltage at a constant frequency together with a constant voltage at a variable frequency. The aircraft engine is started by external AC power and once the engine has started, the engine can supply power back to the variable frequency AC bus as well as back to the constant frequency AC bus, through the start/generator converter mode. The external AC power is then directly used to generate a field at standstill by rearranging the exciter field windings.

DETAILED DESCRIPTION OF THE INVENTION

Figure 1:
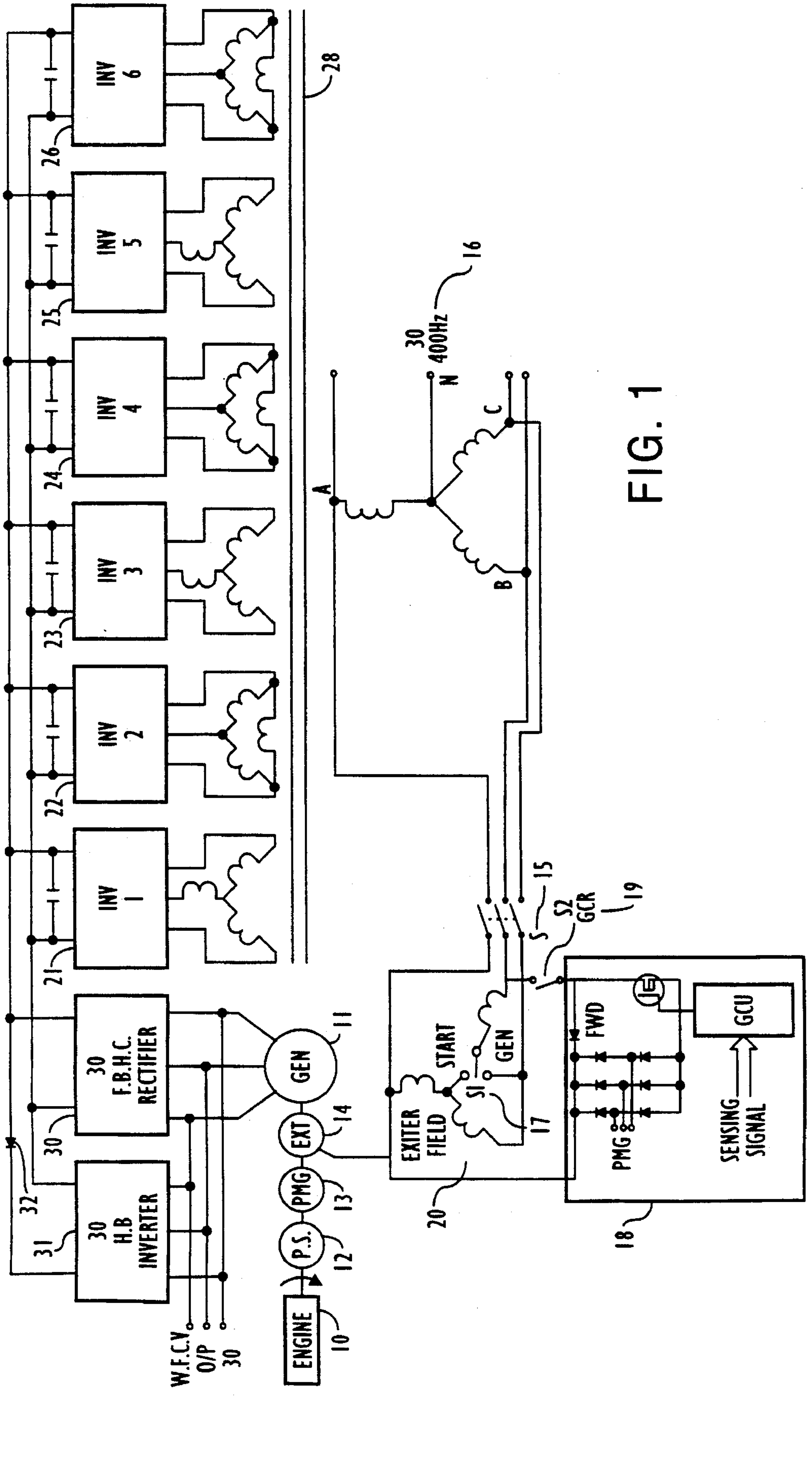
FIG. 1 illustrates a schematic of one embodiment of the present invention.
Figure 2:
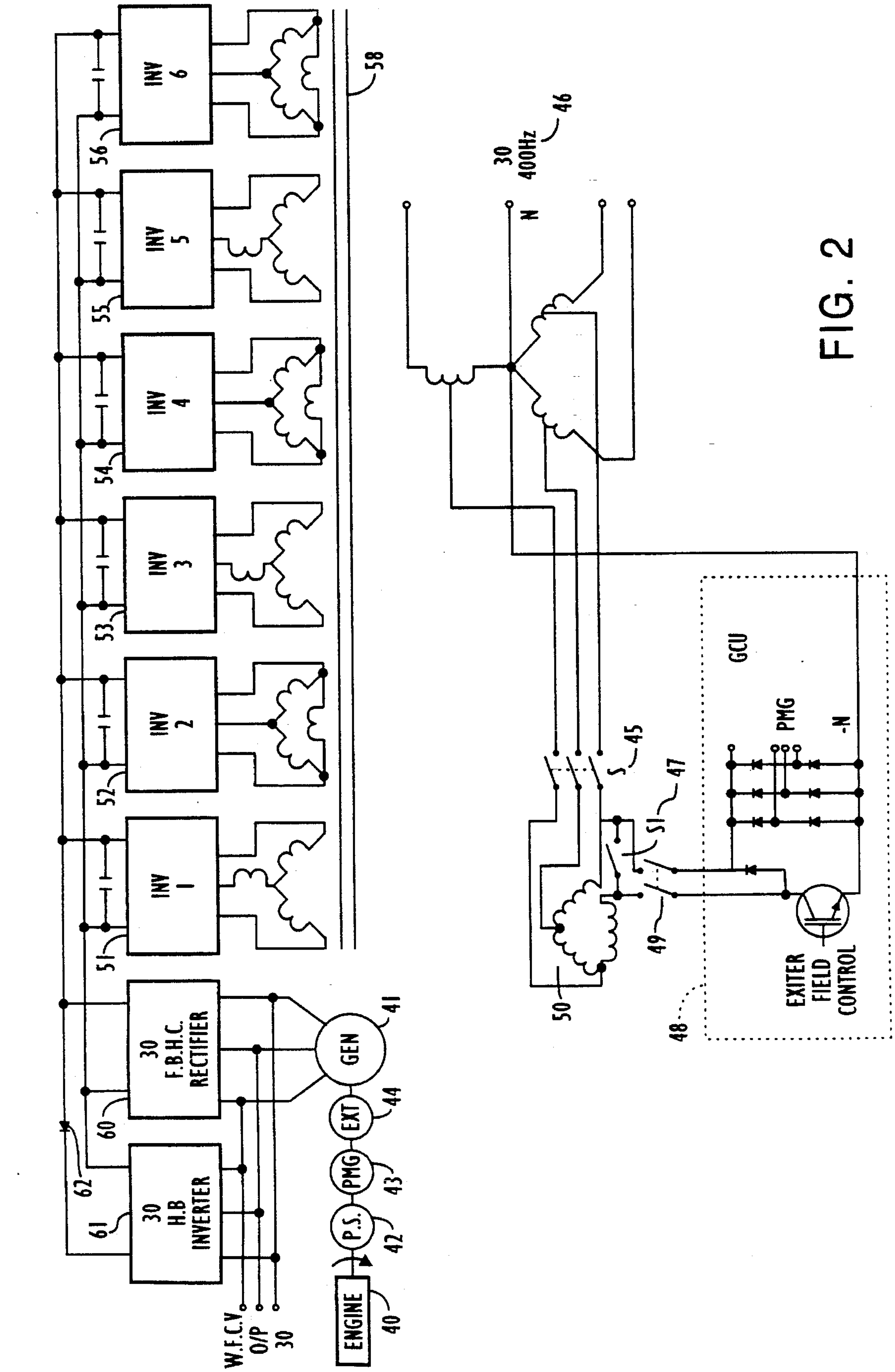
FIG. 2 illustrates a schematic of a second embodiment of the present invention.

FIG. 1 and FIG. 2 show schematics of engine start schemes from an external AC voltage source not requiring the use of a power inverter for the exciter field. When the synchronous generator/motor is at a standstill, voltage cannot be generated in the exciter if the applied voltage of the exciter field is DC. As is known in the prior art, to start the synchronous generator/motor, the motor exciter field had to be excited by a low power inverter of either single phase or three phase. Due to this excitation, voltage was induced in the exciter and the rectified voltage was used as an exciter field for synchronous motor action.

In the present invention, three phase, 400 Hz AC voltage itself is used for the exciter field. This voltage is connected to the prior art circuitry, through wye configuration 18 in FIG. 1 and delta configuration 28 in FIG. 2 by using switches S, $S_1$ and $S_2$.

In FIG. 1, an output shaft of aircraft engine 10 is mechanically coupled to variable-speed AC generator 11 through resolver 12, permanent magnet generator 13 and exciter 14. Generator 11 is connected to an AC to DC rectifier 30 to produce a DC voltage. Three phase inverters 21–26 receive this DC voltage and produce a three phase AC output. In a preferred embodiment, inverters 21–26 comprise six identical inverter bridges. The output of the inverter bridges connect to six individual primaries of transformer 28. Inverters 21, 23 and 25 connect to the primaries of transformer 28 in a wye configuration and inverters 22, 24 and 26 connect to the primaries of transformer 28 in a delta configuration. Alternate configurations are possible as long as an equal number of inverters connect in a wye and delta configuration. Exciter field control 18 receives signals from permanent magnet generator 13 and adjusts the excitation of exciter field 20.

In operation, switch S 15 is closed and $S_1$ 17 is kept in a start position while switch $S_2$ 19 is opened. Engine 10 is started from three phase 400 Hz AC voltage 16. Once engine 10 is started, switch S 15 is opened, $S_1$ 17 is turned to generator mode, and $S_2$ 19 is closed. Once the new configuration, generator mode, is achieved, then three phase inverters 21–26 are excited and receive 400 Hz aircraft power. Connected to three phase inverters 21–26 is full bridge half controlled rectifier 30 which provides output voltage regulation to generator 12. Also connected to three phase inverters 21–26 through series diode 32 is half bridge inverter 31. Series diode 32 decouples inverter 31 and allows for 115 VAC variable frequency power as well as 115 VAC 400 Hz power.

In FIG. 2, an output shaft of aircraft engine 40 is mechanically coupled to variable-speed AC. generator 41 through resolver 42, permanent magnet generator 43 and exciter 44. Generator 41 is connected to an AC to DC rectifier 60 to produce a DC voltage. Three phase inverters 51–56 receive this DC voltage and produce a three phase AC output. In a preferred embodiment, inverters 51–56 comprise six identical inverter bridges. The output of the inverter bridges connect to six individual primaries of transformer 58. Inverters 51, 53 and 55 connect to the primaries of transformer 58 in a wye configuration and inverters 52, 54 and 56 connect to the primaries of transformer 58 in a delta configuration. Alternate configurations are possible as long as an equal number of inverters connect in a wye and delta configuration. Exciter field control 48 receives signals from permanent magnet generator 43 and adjusts the excitation of exciter field 50.

In the case of FIG. 2 during start, switch S 45 and $S_1$ 47 is closed and generator relay 49 is open. Engine 40 is started from three phase 400 Hz AC voltage 46. Once engine 40 is started, then S 45 and $S_1$ 47 is opened and generator relay 49 is closed. Once the new configuration or generator configuration is achieved, then three phase inverters 51–56 are excited and receive 400 Hz aircraft power. Connected to three phase inverters 51–56 is full bridge half controlled rectifier 60 which provides output voltage regulation to generator 41. Also connected to three phase inverters 51–56 through series diode 62 is half bridge inverter 61. Series diode 62 decouples inverter 61 and allows for 115 VAC variable frequency power as well as 115 VAC 400 Hz power.

By rearranging the exciter field winding, the external AC power is directly used to generate a field at standstill.

Advantages of this present invention are that there is no need for an extra power inverter. Also, in start operation, PWM and positioning sensing help in reducing torque pulsation.

It is not intended that this invention be limited to the hardware arrangement, or operational procedures shown disclosed. This invention includes all of the alterations and variations thereto as encompassed within the scope of the claims as follows.

We claim:

1. A novel aircraft engine start system without the use of a separate exciter field inverter comprising:

- resolver means connected to an output shaft of an aircraft engine;
- permanent magnet generator means connected to said resolver means;
- exciter means connected to said permanent magnet generator means wherein said exciter means comprises an exciter field;
- generator means connected to said exciter means;
- rectifier means connected to said generator means;
- a plurality of inverter means connected to said rectifier means;
- transformer means connected to said plurality of inverter means;
- diode means connected to said plurality of inverter means;
- half bridge inverter means connected to said rectifier means and to said diode means;
- a first switch means connected between said exciter field and 400 Hz AC voltage;
- a second switch means connected to said exciter field;
- exciter field control means connected to said second switch means; and,
- third switch means connected within said exciter field for switching from start to generator mode;
- wherein by rearranging exciter field windings within said exciter field, and by properly arranging said first switch means, said second switch means and said third switch means, 400 Hz AC voltage is directly used to generate a field and start said aircraft engine without the use of a separate exciter field inverter.

2. A novel aircraft engine start system without the use of a separate exciter field inverter as claimed in claim 1 wherein said rectifier means comprises a full bridge half controlled rectifier.

3. A novel aircraft engine start system without the use of a separate exciter field inverter as claimed in claim 1 wherein said plurality of inverter means comprises six three phase inverters with each having a capacitor across its input.

4. A novel aircraft engine start system without the use of a separate exciter field inverter as claimed in claim 3 wherein said six three phase inverters receive DC voltage from said rectifier means and provide three phase AC voltage to said transformer means through either a delta or wye connection.

5. A novel aircraft engine start system without the use of a separate exciter field inverter as claimed in claim 3 wherein said transformer means comprises six individual primaries, each connected to one of said six three phase inverters through either a delta or wye connection.

6. A novel aircraft engine start system without the use of a separate exciter field inverter as claimed in claim 1 wherein said exciter field control means receives signals from said permanent magnet generator means.

7. A novel aircraft engine start system without the use of a separate exciter field inverter as claimed in claim 1 wherein said diode means decouples half bridge inverter means and allows for 115 volts AC variable frequency power as well as 115 volts 400 Hz power.

* * * * *